UNITED STATES PATENT OFFICE.

HIRAM DURYEA, OF NEW YORK, N. Y.

METHOD OF MANUFACTURING STARCH.

SPECIFICATION forming part of Letters Patent No. 300,700, dated June 17, 1884.

Application filed February 21, 1884. (No specimens.)

*To all whom it may concern:*

Be it known that I, HIRAM DURYEA, of New York, in the county of New York and State of New York, have invented a certain new and useful Improvement in the Method of Manufacturing Starch, of which the following is a specification.

My method relates to the manufacture of starch from corn or other grain. It enables starch to be produced more rapidly and at less expense than heretofore, and of as good or a better quality.

The appliances or apparatus that I make use of may be generally the same as are usually employed in starch-factories, and do not therefore require to be especially described. I first thoroughly steep the grain, then grind it, by means of any suitable mills, with water, and next subject the ground mass to the action of sieves or separators, for the purpose of separating the husks and coarser matter of the grain from the fluid portion of the mass, which contains the starch, gluten, &c., and is known as "starch-water" or "starch-liquor." This starch-water is collected in a suitable vat or vats, wherein it will be allowed to remain until it condenses or precipitates. The supernatent water will then be run off, and afterward the condensed starch-water may be conducted into an agitator vat or vats, where it is brought to a density of preferably about 11° Baumé by adding water.

In lieu of transferring the condensed starch-water to a vat or vats provided with agitators, the collecting vat or vats may be furnished with agitators.

In the vat or vats provided with the agitators I add to the starch-water a solution of caustic alkali of a density of preferably about 7° Baumé when the starch - water is of a density of about 11° Baumé, applying about four fluid ounces of this solution to each gallon of the starch-water. If the density of the starch-water varies materially from that named, the density of the solution of alkali will be also varied as may be necessary for obtaining the desired results. After the application, I agitate the whole liquid by means of any of the usual stirring devices, preferably, say, not less than about four hours. This agitation may be continued longer at the pleasure of the operator. If preferable, the solution of alkali may be applied and the agitation done, in the manner above described, in the vat or vats in which the starch-water is first collected from the sieves. The agitation being completed, I bring the "liquor" to a density of, say, about 9° Baumé by adding water, and then conduct it into a separating vat or vats provided in the sides with holes fitted with plugs, or with pipes, siphons, or equivalent means. In the separating vat or vats I allow the liquor to rest undisturbed for, say, about two hours. At the end of this period an important separation of the constituents of the starch-liquor will have taken place, and they will be found to have arranged themselves in three distinct strata or divisions, consisting, respectively, of a top stratum of watery glutinous solution, a lower stratum composed of a thick glutinous solution containing some starch, and a bottom stratum consisting of a heavy solution of nearly or quite pure starch.

Instead of providing special vats wherein to effect the separation of the liquor into the strata described, I may produce the stratification of the liquor by allowing it to rest for the necessary length of time in the vat or vats wherein it was previously agitated. In such case the vat or vats last referred to will be provided with holes fitted with plugs or cocks, or with pipes, siphons, or equivalent means. After the stratification, I draw off through the holes, cocks, pipes, siphons, or other means the glutinous solutions constituting the top and next lower strata, and afterward, and by itself, the starch solution constituting the bottom stratum. The latter may need no further treatment except to expel the water which is contained in it. It may, however, be washed. It can be finished in the usual manner. Nevertheless, if preferable for any reason, this may be diluted with water and run over starch-planes, or treated by subsidence and decantation in cisterns before finishing it. The thick glutinous solution is diluted with water, and the resultant liquor vigorously agitated to disentangle from the gluten, &c., any particles of starch that may be held thereby. The liquor may afterward be run over starch-planes or treated by subsidence and decantation in cisterns in a well-known manner, in order that the starch remaining therein may be obtained. This starch may be finished in the usual manner.

While the figures I have given for densities, quantities, and times I have found to be generally correct to secure the results named, they are not intended to be rigidly exact under all circumstances, but may be varied according to the character of the grain, quality of water, depth of the vat or vats, and the temperature and condition of the atmosphere, such variations being made according to the judgment of the skilled operator.

It is well known that when, as by the old method, the whole of the starch-water previous to any separation, and while the gluten, &c., and the starch are intimately mingled, is run over the starch-plane or treated by subsidence and decantation in cisterns, some of the gluten, &c., is apt to deposit with the starch and render it impure, while, on the other hand, an important percentage of starch is carried over the ends of the planes with the gluten, &c., necessitating further treatment for its recovery. By my process a very large proportion of pure or nearly pure starch is obtained by the first separation in the vat or vats, as described, requiring but little or no after treatment for securing purity; and the glutinous residue, when run over the starch-planes or subsided and decanted in cisterns, readily yields up the starch that remained in it, which is then ready for finishing in the usual way. The time required for separating in the vat or vats is so short that the same vats can be used repeatedly at short intervals, for which reason only a small number of vats will be required and less attendance, whereby the manufacture of starch is not only facilitated, but the starch is produced at less cost. Mine is essentially a fluid process, as the starch, after the separation in the vat or vats first referred to, remains in solution until its removal therefrom, except that there may or may not be a very inconsiderable deposit on the bottom of the vat. The speedy separation, maintenance of fluidity, and certainty of result are due to my method of treatment, as before described.

What I claim as my invention, and desire to secure by Letters Patent, is—

1. In the manufacture of starch, the application of a solution of alkali to a starch-water, and the subsequent stratification of the resultant liquor, substantially as specified.

2. The process of manufacturing starch, consisting in grinding grain with water, sieving the same, condensing the starch-water passed through the sieves, applying a solution of alkali to the condensed starch-water, effecting the stratification of the resultant liquor into a solution of starch and glutinous solutions, removing the glutinous solutions and the starch solution separately, and subsequently treating some or all of the glutinous solutions to obtain whatever starch may be contained therein, substantially as specified.

HIRAM DURYEA.

Witnesses:
T. J. KEANE,
JAMES R. BOWEN.